United States Patent [19]
Suzuki

[11] Patent Number: 5,634,162
[45] Date of Patent: May 27, 1997

[54] PROGRAMMED CONTROL OF VIDEO TRIGGER AND SHUTTER RELEASE IN COMPOSITE CAMERA

[75] Inventor: Etsurou Suzuki, Yokohama, Japan

[73] Assignee: Canon Kabushiki Kaisha, Tokyo, Japan

[21] Appl. No.: 546,488

[22] Filed: Oct. 20, 1995

[30] Foreign Application Priority Data

Nov. 4, 1994 [JP] Japan .................................. 6-271123

[51] Int. Cl.[6] .................................. G03B 29/00
[52] U.S. Cl. .................................. 396/429; 348/64
[58] Field of Search .................................. 396/429, 502; 348/64; 352/131

[56] References Cited

U.S. PATENT DOCUMENTS 3,546,375  12/1970  Vitt .................................. 356/5.05
5,389,984  2/1995  Lovenheim .................................. 396/429

FOREIGN PATENT DOCUMENTS 57-96444   6/1982  Japan .................................. G03B 29/00
63-261336 10/1988  Japan .................................. G03B 17/38
1-185533   7/1989  Japan .................................. G03B 13/02

*Primary Examiner*—Howard B. Blankenship
*Attorney, Agent, or Firm*—Fitzpatrick, Cella, Harper & Scinto

[57] ABSTRACT

In a camera capable of performing moving-picture recording and still-picture recording, if a still-picture recording operation is performed within a predetermined time period after an operation to stop moving-picture recording has been erroneously performed instead of a still-picture recording operation during moving-picture recording, the operation to stop moving-picture recording is cancelled.

20 Claims, 5 Drawing Sheets

PROGRAMMED CONTROL OF VIDEO TRIGGER AND SHUTTER RELEASE IN COMPOSITE CAMERA

BACKGROUND OF THE INVENTION

1. Field of the Invention

This invention relates to a composite camera, and more particularly, to a camera which integrates a still-picture camera (which uses a silver-halide film or the like) with a video camera (video movie camera).

2. Description of the Related Art

In events, such as athletic contests, literary exercises and the like, there has been a desire to perform a photographing operation using a still-picture camera for recording still images using a silver-halide film or the like while performing a photographing operation using a video camera for recording moving images on a recording medium, such as a magnetic tape or the like.

On the other hand, there exists the opinion that it is troublesome to carry both a video camera and a still-picture camera during a trip or the like. In order to fulfill such requests, various kinds of cameras each integrating a video camera and a still-picture camera have been proposed.

For example, U.S. Pat. No. 3,546,375 discloses a camera in which a moving mirror is disposed in the optical path of a photographing objective lens, and still pictures and moving pictures can be recorded on different recording media by selectively switching the position of the moving mirror.

Japanese Utility Model Laid-Open Application (Kokai) No. 57-96444 (1982) discloses a camera in which an optical photographing unit for photographing images on a silver-halide film is detachably mounted integrally with or separately from a main body of a video camera. Japanese Patent Laid-Open Application (Kokai) No. 1-185533 (1989) discloses a composite camera having a confirming function in which an image signal from a photoelectric image pickup device corresponding to an image to be focused onto a silver-halide film is displayed on a monitor.

However, the above-described conventional cameras do not provide sufficient means to prevent a decrease in the operability caused by integrating a camera for photographing still pictures and a camera for photographing moving pictures, and to enable the user to easily perform a photographing operation intended by the user.

In conventional composite cameras, there are provided a trigger button for starting and stopping moving-picture recording (in an ordinary video camera, recording/stopping is repeated every time the trigger button is switched on), and a shutter button for still-picture recording. In a composite camera proposed in Japanese Patent Laid-Open Application (Kokai) No. 63-261336 (1988), a trigger button for moving-picture recording and a shutter button for still-picture recording are provided at different surfaces of the camera.

In such a camera, since a starting/stopping operation for moving-picture recording and an operation for still-picture recording are performed using different fingers of the photographer, the probability of a mistaken operation is reduced. However, the following problems remain even in this camera.

The photographer must always utilize one finger for the trigger button for moving-picture recording and another finger for the shutter button for still-picture recording even while he devotes himself to a photographing operation. If he happens to depress a wrong button, a mistaken operation will occur.

When he happens to depress the shutter button for still-picture recording intending to stop moving-picture recording, no fatal result is obtained although moving-picture recording for an extra time period and an extra still picture result.

On the other hand, if the trigger button for moving-picture recording is depressed intending to depress the shutter button for still-picture recording (or the two buttons are simultaneously depressed), a worst case may occur in which the crucial moment of recording a still picture during moving-picture recording has been missed, and instead moving-picture recording has been interrupted and a still picture has not been recorded either.

SUMMARY OF THE INVENTION

The present invention has been made in consideration of the above-described problems.

It is an object of the present invention to provide a composite still-video camera in which a misoperation is prevented.

It is another object of the present invention to provide a composite camera in which, even if a trigger button for moving-picture recording is erroneously depressed intending to depress a shutter button for still-picture recording during moving-picture recording, the recording is not interrupted and recovery can be easily performed after the trigger button has been erroneously depressed.

It is still another object of the present invention to provide a composite camera in which moving-picture recording is not interrupted even if a trigger button for moving-picture recording is erroneously depressed immediately after a shutter button for still-picture recording has been depressed.

It is yet another object of the present invention to provide a camera in which even if an instruction to interrupt moving-picture recording is provided during moving-picture recording, execution of the instruction is reserved. If an instruction to execute still-picture recording is provided within a predetermined time period after the reserved instruction, the reserved instruction is cancelled. If no instruction to execute still-picture recording is provided within the predetermined time period, the reserved instruction is executed.

It is yet a further object of the present invention to provide a camera in which if an instruction to interrupt moving-picture recording is provided within a predetermined time period after an instruction to execute still-picture recording has been issued during moving-picture recording, the instruction to interrupt moving-picture recording is cancelled.

According to one aspect, the present invention, which achieves these objectives, relates to a composite camera integrating a camera for recording moving pictures and a still-picture camera for recording still pictures, comprising first instruction means for instructing start and stop operations of moving-picture recording, second instruction means for instructing still-picture recording operations, and control means. The control means reserves execution of an instruction from the first instruction means when the instruction has been provided during moving-picture recording, cancels the reserved instruction from the first instruction means when an instruction from the second instruction means has been provided within a predetermined time period after the instruction from the first instruction means, and terminates the moving-picture recording by executing the reserved instruction from the first instruction means when no instruction has been provided from the second instruction means within the predetermined time period after the instruction from the first instruction means.

According to another aspect, the present invention relates to a composite camera integrating a camera for recording moving pictures and a still-picture camera for recording still pictures, comprising first instruction means for instructing start and stop operations of moving-picture recording, second instruction means for instructing still-picture recording operations, and control means. If an instruction is provided from the first instruction means within a predetermined time period after an instruction from the second instruction means has been provided during moving-picure recording, the control means cancels the instruction from the first instruction means.

According to still another aspect, the present invention relates to a composite camera integrating a camera for recording moving pictures and a still-picture camera for recording still pictures, comprising first instruction means for instructing start and stop operations of moving-picture recording, second instruction means having two steps for instructing still-picture recording operations, and control means. The control means reserves execution of an instruction from the first instruction means when the instruction has been provided during moving-picture recording, cancels the reserved instruction from the first instruction means when an operation in a first step of the second instruction means has been performed within a predetermined time period after the instruction from the first instruction means, and terminates the moving-picture recording by executing the reserved instruction from the first instruction means when no operation in the first step of the second instruction means has been performed within the predetermined time period after the instruction from the first instruction means.

According to still another aspect, the present invention relates to a composite camera integrating a camera for recording moving pictures and a still-picture camera for recording still pictures, comprising first instruction means for instructing start and stop operations of moving-picture recording, second instruction means having two steps for instructing still-picture recording operations, and control means. If an instruction is provided from the first instruction means within a predetermined time period after an operation in a first step of the second instruction means has been performed during moving-picure recording, the control means cancels the instruction from the first instruction means.

According to still another aspect, the present invention relates to a camera comprising moving-picture recording means, still-picture recording means, first operation means for controlling the moving-picture recording means, second operation means for controlling the still-picture recording means, control means for cancelling an operation of the first operation means if the second operation means provides an instruction to begin an operation of the still-picture recording means within a predetermined time period after the first operation means has provided an instruction to stop the moving-picture recording means while the moving-picture recording means operates.

According to still another aspect, the present invention relates to a camera comprising a first camera unit, a second camera unit, first instruction means for instructing a photographing operation or a non-photographing operation of the first camera unit, second instruction means for instructing a photographing operation or a non-photographing operation of the second camera unit, and control means for cancelling an instruction by the first instruction means if the second instruction means is operated within a predetermined time period after an instruction to stop an operation of the first camera unit has been provided by the first instruction means during a photographing operation of the first camera unit.

According to still another aspect, the present invention relates to a camera comprising a first camera unit, a second camera unit, first instruction means for controlling a photographing operation of the first camera unit, second instruction means for controlling a photographing operation of the second camera unit, and control means for cancelling an operation of the first instruction means when the first instruction means and the second instruction means have been consecutively operated within a predetermined time period.

The foregoing and other objects, advantages and features of the present invention will become more apparent from the following detailed description of the preferred embodiments taken in conjunction with the accompanying drawings.

DETAILED DESCRIPTION OF THE PREFERRED EMBODIMENTS

Preferred embodiments of the present invention will now be described in detail with reference to the drawings.

First Embodiment

Figure 1:
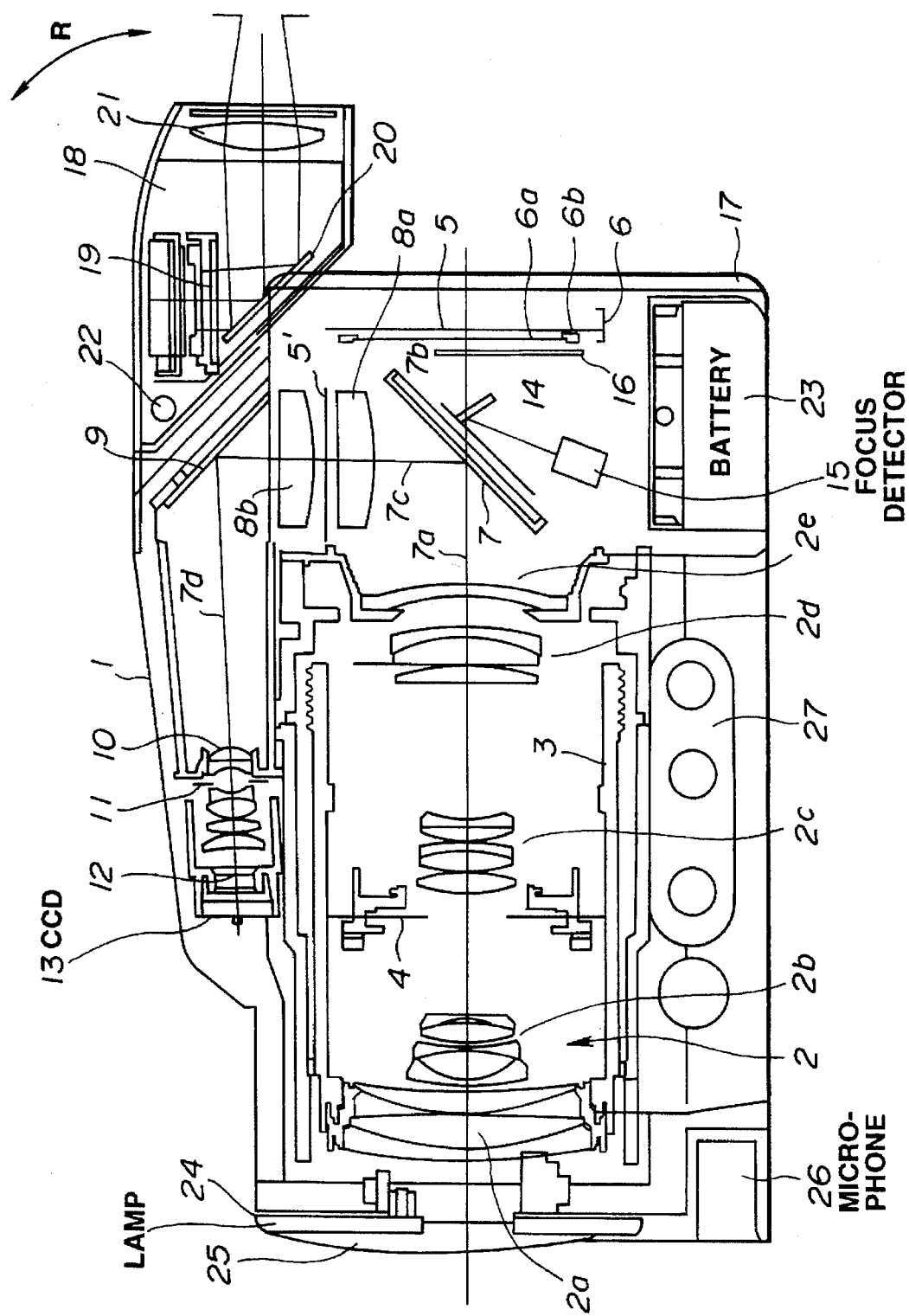
FIG. 1 is a left-side cross-sectional schematic view illustrating the configuration of a camera according to a first embodiment of the present invention.

FIG. 1 is a left-side cross-sectional schematic view of a "composite camera" according to a first embodiment of the present invention. In FIG. 1, reference numeral 1 represents an outer cover of the camera. A lens unit 2 receives an image and focuses it onto a silver-halide film 5. A lens barrel 3 holds lens elements constituting the lens unit 2. Reference numeral 4 represents an iris stop for photographing silver-halide still pictures. In the present embodiment, the lens unit 2 comprises a zoom lens, and includes a group of variable-magnification lens elements movable along the optical axis linked with an automatic or manual zooming operation, and a group of focusing lens elements driven in accordance with information from an automatic focus adjusting device (to be described later).

The lens unit 2 of the present embodiment performs a magnification-varying operation by driving a first lens group 2a, a second lens group 2c and a fourth lens group 2d, and corrects a change in the position of the image-forming surface during the magnfication-varying operation by driving a third lens group 2c in accordance with the magnification-varying operation. A fifth lens group 2e is fixed.

A shutter device 6 is disposed immediately before the silver-halide film 5 and exposes it. The shutter device 6 comprises a shutter screen 6a, a shutter frame 6b and the like. A semitransparent thin-film mirror 7 distributes an image from an object to the silver-halide film 5 and to a video image pickup device 13. Reference numeral 7a represents an optical axis of light incident from the object. Reference numeral 7b represents an optical axis of light transmitted through the semitransparent thin-film mirror 7 and reaching the silver-halide film 5. Reference numeral 7c and 7d represent an optical axis of light reflected by the semitransparent thin-film mirror 7 and incident upon the video image pickup device. Field lenses 8a and 8b are provided on the optical axis 7c in order to perform pupil adjustment for the image of the object. A reflecting mirror 9 deflects the photographing optical axis 7c. A reduction lens unit 10 is provided on the optical axis 7d, and includes a video stop unit 11 for photographing video moving pictures. Reference numeral 12 represents an optical low-pass filter, and reference numeral 13 represents a solid-state image pickup device, such as a CCD (charge-coupled device) or the like. Reference numeral 5' represents an air image focused on a position equivalent to the silver-halide film 5, and is reimaged onto the solid-state image pickup device 13 via the reduction lens unit 10.

A submirror 14 is provided behind the semitransparent thin-film mirror 7, and is retractable during a photographing operation. The submirror 14 guides part of photographing light to an automatic focus detection device 15. The automatic focus detection device 15 of the present embodiment adopts a known phase-difference detection method, and detects the amount and the direction of defocus on the surface of the film 5 by comparing a plurality of images produced by light beams passing through a plurality of different regions of the photographing lens with one another. Since an image of the object is always obtained on the solid-state image pickup device 13, automatic focus adjustment according to a defocusing method may be performed based on a high-frequency-component signal in an image signal output from the solid-state image pickup device 13. Alternatively, the above-described two methods may be combined.

Since the semitransparent thin-film mirror 7 is used, a light-blocking plate 16 retractable during a photographing operation is used in order to prevent penetration of light.

A back-cover unit 17 is provided so as to be openable/closable when loading the silver-halide film 5. Although in the present embodiment, a 135-type silver-hailde film is used, the present invention is not limited to such a film, but a film of any other type, such as a drop-in type, a disk-type or the like, may also be used.

An electronic view finder unit 18 outputs an image to a small liquid-crystal display unit 19 in order to monitor an image signal from the solid-state image pickup device 13. The image is observed via a reflecting mirror 20 and an eyepiece 21. The view finder unit 18 is rotatable around a rotation axis 22 in the direction of an arrow R.

In the configuration shown in FIG. 1, the iris stop 4 for photographing silver-halide still pictures is always maintained in an opened state during a photographing operation of video moving pictures, and is stopped to a predetermined diameter based on the result of photometry when a release switch fop photographing silver-halide still pictures (to be described later) is depressed. Accordingly, during a photographing operation of moving pictures, exposure is controlled only by the video stop unit 11 in the reduction lens unit 10. Optimum exposure is obtained by changing the storage time of the solid-state image pickup device 13 (an electronic shutter) or the gain of a signal processing system (AGC (automatic gain control)).

A secondary battery 23 is detachably mounted in a lower portion of the camera, and operates as a single common power supply for supplying all electric power used in the camera. An openable/closable barrier 25 incorporating a stroboscopic lamp 24 is diposed in front of the lens unit 3. A microphone 26 records sounds during a video photographing operation. An external terminal 27 serves as an interface with an external apparatus, such as a television, a stereophonic apparatus or the like.

Figure 2:
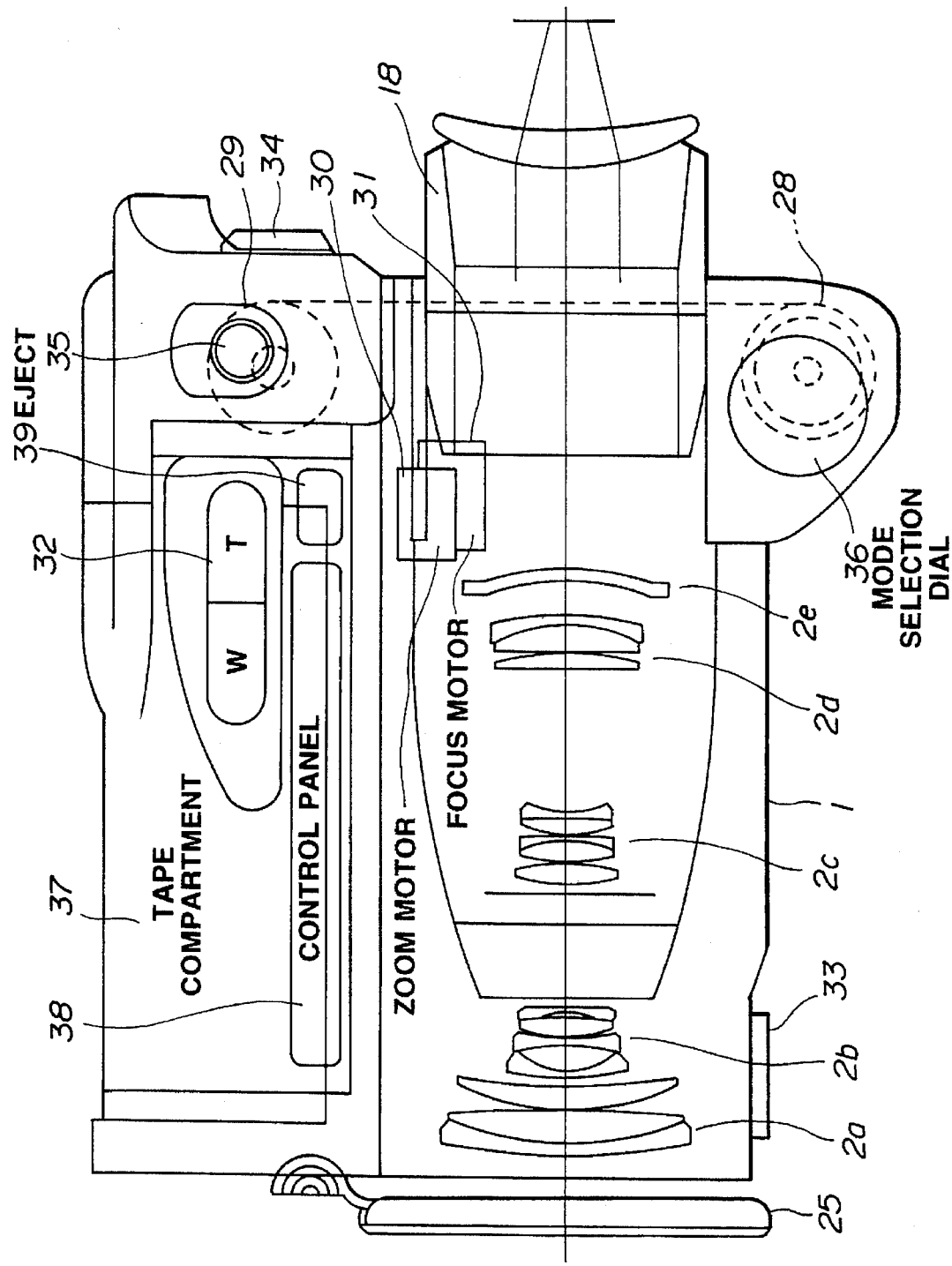
FIG. 2 is a top-side cross-sectional schematic view of the camera shown in FIG. 1.

FIG. 2 is a top-side cross-sectional schematic view of the camera shown in FIG. 1. In FIG. 2, reference numeral 28 represents a cartridge chamber for the silver-halide film 5, and reference numeral 29 represents a spool for winding the silver-halide film 5. In the present embodiment, a prewinding method, in which a film is wound up to the final frame when loading the film, and exposed frames are sequentially rewound during photographing operations, is adopted.

Reference numerals 30 and 31 represent a motor for zooming driving of the photographing lens and a motor for focusing driving of the photographing lens, respectively. A zooming button 32 is disposed at a position where it can be operated by the right hand of the photographer. A main-mode selection switch 33 also operates as a power-supply switch. Reference numeral 34 represents a trigger button (start/stop button) for video moving-picture recording, and reference numeral 35 represents a shutter button (also called a shutter-release button) for still-picture recording which can be used during only a photographing operation of a silver-halide still picture as well as during simultaneous photographing operations of moving pictures and a silver-halide still-picture.

A mode selection dial 36 for selecting a program exposure mode, a portrait mode (in which an open stop is frequently used), a sports mode (giving priority to the shutter speed), a backlit photographing mode, or the like both in a moving-picture photographing operation and a still-picture photographing operation is disposed at a side opposite to the above-described operation members 34 and 35.

A result of photometry in each of the above-described modes is subjected to feedback control in accordance with the level of a luminance signal from the solid-state image pickup device 13. Although in the present embodiment, the solid-state image pickup device 13 for video pictures is also used as a photometric device by electrically dividing its area, a dedicated photometric device may also be used.

A video-tape-cassette accommodating unit 37 is disposed at the right of the lens unit 2. Although in the present embodiment, a video tape having a width of 8 mm is used as a video-image recording medium, the present invention is not limited to the video tape of this size. The cassette accommodating unit 37 has a VCR (video cassette recorder) recording mechanism comprising a magnetic-head cylinder, a capstan, a pinch roller and the like. A control panel 38 for controlling recording/reproducing operations of the video tape, and the like, an ejection button 39 for instructing automatic loading/discharging operations, and the like are disposed on the upper surface of the cassette accommodating unit 37.

Figure 3:
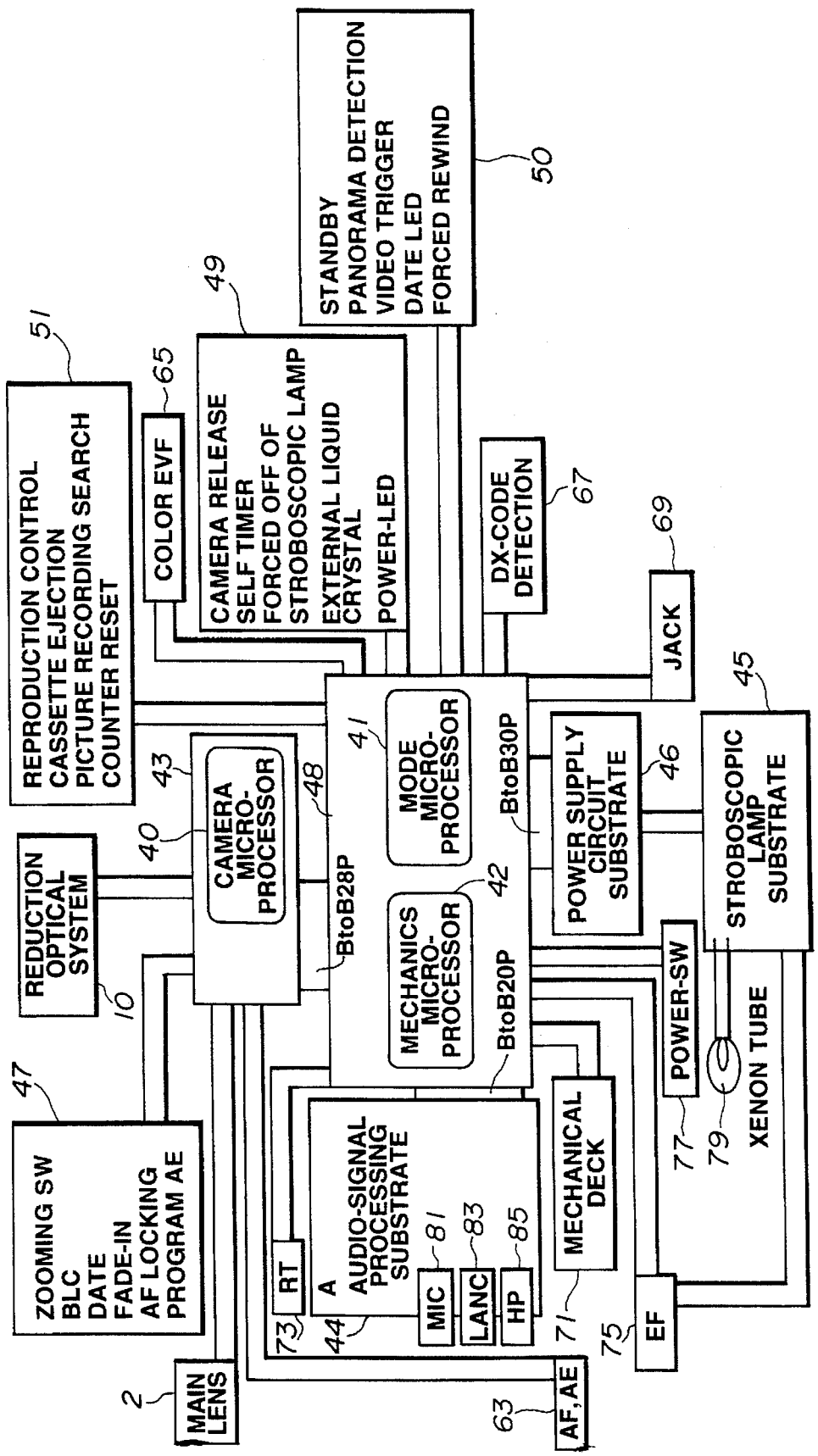
FIG. 3 is a block diagram illustrating the configuration of system control in the first embodiment.

FIG. 3 is a block diagram illustrating the configuration of system control in the present embodiment. Principal components are a camera microprocessor 40 for performing control by receiving operation inputs for zooming, exposure, AF (autofocusing) and the like, a mode microprocessor 41 for controlling release and mode setting in the main body of the camera, and a mechanics microprocessor 42 for controlling driving of a tape recording/reproducing servo mechanism. Camera-video-signal processing substrate (printed circuit board) 43, an audio-signal processing substrate 44, a stroboscopic lamp substrate 45, a power supply circuit substrate 46, and the like are connected to these components.

More specifically, AF and AE (autoexposure) circuits 63 are connected to the camera-video-signal processing substrate 43 including the camera microprocessor 40. The camera microprocessor 40 controls the main lens 2, and the reduction optical system 10 for video pictures in accordance with the focus value and the photometric value detected by these circuits.

A switch group 47 relating to camera operations, comprising a zooming switch for effecting a zooming operation, a BLC switch for performing back light compensation, a DATE switch for inputting a date, a fade-in switch for performing a fade-in operation, an AF locking switch, a program AE switch for selecting a photographing mode, and the like, is connected to the camera microprocessor 40. The main lens 2, and the reduction optical system 10 for video pictures are controlled in accordance with operations of these switches.

The camera-video-signal processing substrate 43 is connected to a video/system control substrate 48 for performing video-signal processing for recording a video signal on a recording medium, such as a video tape or the like, and system control of the entire camera. The mechanics microprocessor 42 for controlling a tape deck mechanism, and the mode microprocessor 41 for controlling various kinds of operation modes for the camera, the deck and the like are disposed on the video/system control substrate 48.

A color EVF (electronic view finder) 65 for monitoring a video signal supplied from the camera-video-signal processing substrate 43, a video signal reproduced by the tape deck, and the like, is connected to the video/system control substrate 48. As for camera control, a control-display section 49 comprising various operation switches for camera release, a self-timer, forced OFF of a stroboscopic lamp, control of an external liquid-crystal display unit, a power LED (light-emitting diode), serving as a power indicator, and the like, and a display unit, a control section 50 for performing operations, such as standby, panorama detection, video trigger, a date LED, a forced rewind of a silver-halide film, and the like, and a DX-code detection section 67 for detecting data of the film are connected to the video/system control substrate 48.

As for the deck, a deck control section 51 for performing operations, such as control of various kinds of modes and operations during a reproducing operation, ejection of a cassette, picture recording search, counter reset and the like, is connected to the video/system control substrate 48.

In addition, a JACK 69 having various kinds of input/output terminals, a tape deck (mechanical deck) 71, a block RT 73 for a remote-control photosensing unit/ a tarry lamp, a stroboscopic-light controlling sensor EF 75, a power switch 77, and a power supply circuit substrate 46 are connected to the video/system control substrate 48. A stroboscopic lamp substrate 45 for driving a xenon tube 79 is connected to the power supply circuit substrate 46.

Terminals for a microphone MIC 81, an external wire remote control unit LANC 83 and a headphone HP 85 are provided on an audio-signal processing substrate 44 connected to the video/system control substrate 48.

Figure 4:
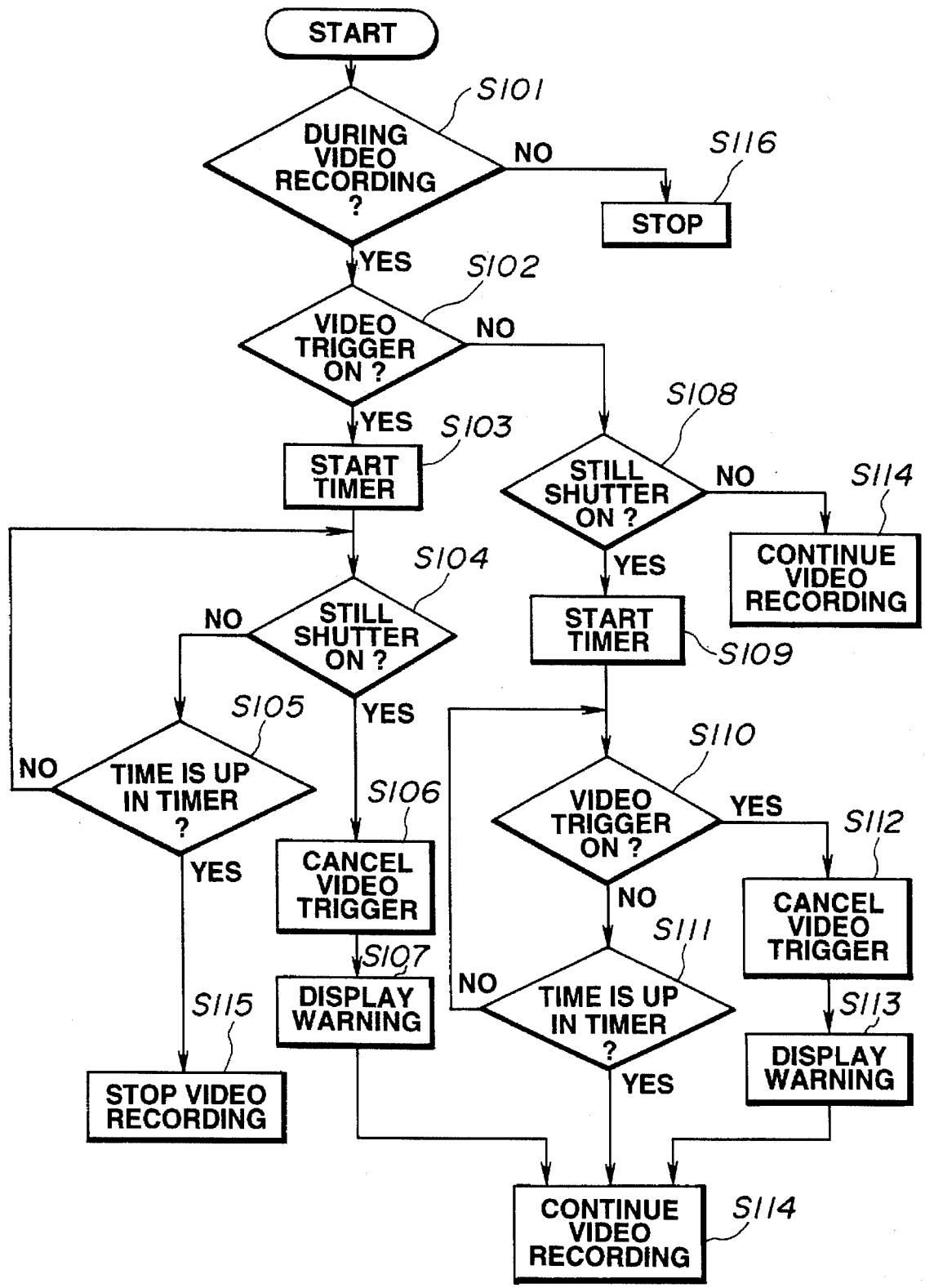
FIG. 4 is a flowchart illustrating operations in the first embodiment.

FIG. 4 is a flowchart illustrating control performed in accordance with the state of input to the shutter button 35 for still-picture recording and the trigger button 34 for moving-picture recording. A description will now be provided of this flowchart.

Upon the start of the processing of the flowchart, it is determined in step S101 if video recording is being performed. In the apparatus of the present embodiment, if the trigger button 34 for moving-picture recording is depressed in a state in which video recording is not being performed, moving-picture recording is started by the mode microprocessor 41 and the mechanics microprocessor 42 to provide a state of video recording. If the result of the determination in step S101 is negative, processing is stopped. If the result of the determination in step S101 is affirmative, the process proceeds to step S102.

In step S102, it is determined if video trigger is ON. If the result of the determination in step S102 is affirmative, i.e., if the trigger button 34 is depressed again during a video recording, and stoppage of video recording is thereby instructed, a signal is input to the mode microprocessor 41, which starts an incorporated timer in step S103. Then, in step S104, it is determined if the still shutter is ON. If the result of the determination in step S104 is negative, it is then determined in step S105 if time is up in the timer. When the shutter button 35 for still-picture recording has been depressed before time is up in the timer, the process proceeds to step S106.

In step S106, the video trigger is cancelled, i.e., the instruction to stop moving-picture recording is cancelled. That is, it is unnatural that immediately after the trigger button 34 has been depressed in step S102 to input a signal to stop moving-picture recording, the shutter button 35 for still-picture recording is depressed in order to perform still-picture recording. Accordingly, it is reasonable to determine that the trigger button 34 has most probably been erroneously depressed. Therefore, the mode microprocessor 41 cancels the information of video trigger ON in step S102 in the processing of step S106.

In step S107, the operator is notified of the wrong operation by performing warning display. The mode microprocessor 41 displays the warning, indicating that the stoppage of the moving-picture recording instructed through the trigger button 34 has been cancelled, in the view finder 18 for a predetermined time period.

If the result of the determination in step S102 is negative, it is then determined in step S108 if the still shutter is ON. If the result of the determination in step S108 is affirmative, i.e., when the shutter button 35 for still-picture recording has been depressed during moving-picture recording, a signal is input to the mode microprocessor 41, and the process proceeds to step S109.

In step S109, the mode microprocessor 41 starts the incorporated timer. In step S110, it is determined if the video trigger is ON. If the result of the determination in step S110 is negative, it is then determined in step S111 if time is up in the timer. When it has been detected that the trigger button 34 for moving-picture recording has been depressed before time is up in the timer, the process proceeds to step S112.

In step S112, the video trigger is cancelled, i.e., the instruction to stop moving-picture recording provided in step S110 is cancelled. That is, it is unnatural that immediately after the shutter button 85 for still-picture recording has been depressed in step S108 in order to perform still-picture recording, the trigger button 34 for moving-picture recording is depressed to stop the moving-picture recording. Accordingly, it is reasonable to determine that the trigger button 34 for moving-picture recording has most probably been erroneously depressed. Therefore, the mode microprocessor 41 cancels the information of video trigger ON in step S110 in the processing of step S112.

In step S113, as in the case of step S107, warning indicating that the stoppage of the moving-picture recording is cancelled is displayed in the view finder 18. In step S114, the video recording is continued.

The mode microprocessor 41 performs control to continue the moving-picture recording after the warning display in step S107, or when time is up in the timer in step S111, or when the still shutter is not ON in step S108, or after warning display in step S113.

When time is up in the timer in step S105 without ON of the still shutter after the video trigger has been ON during moving-picture recording to start the timer, video recording is stopped in step S115. That is, moving-picture recording is stopped when the trigger button 34 has been depressed again during the moving-picture recording and thereafter the shutter button 35 for still-picture recording has not be depressed within a predetermined time period set in the timer.

In the present embodiment, the time period set in the timer in steps S103–S105 and steps S109–S111 is, for example, made to be about three seconds. This value is sufficient for recognizing and recovering a misoperation, and is also effective to minimize an unnecessary recording time period until ordinary moving-picture recording is terminated.

However, the time period to be set is not limited to this value, but may be more or less increased or decreased from this value. The photographer may also set an arbitrary time period from the outside of the camera via an operation member (not shown).

Second Embodiment

Figure 5:
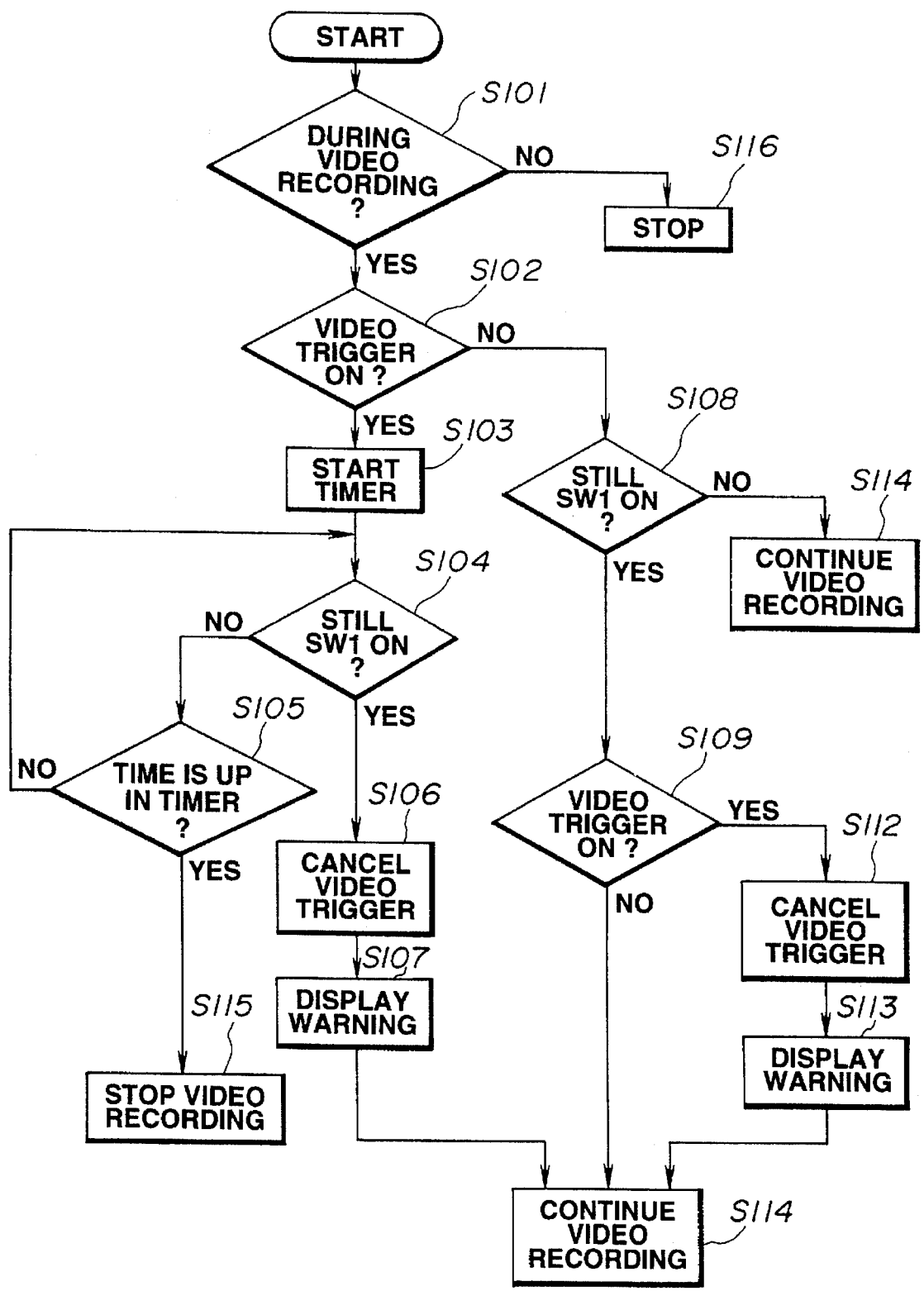
FIG. 5 is a flowchart illustrating operations in a second embodiment of the present invention.

FIG. 5 is a flowchart illustrating operations in a second embodiment of the present invention. Processes in which the same operations as in the first embodiment are performed are indicated by the same reference numerals, and a further description thereof will be omitted. In the second embodiment, the shutter button 35 for still-picture recording comprises SW1 (switch1) and SW2 (switch2) for performing two-step strokes.

A description will now be provided of the SW1 and SW2. Consider a case of recording a still picture while moving pictures are recorded. In order to realize energy saving in a battery, for example, it is more efficient to charge a capacitor for light emission from a stroboscopic lamp immediately before recording a still picture than always charging the capacitor. Since a time is required until the iris stop 4 for photographing a still picture reaches a predetermined stop value, it is preferable to move the iris stop 4 immediately before staring a photographing operation in order to shorten a time lag from shutter release to actual exposure. The SW1 performs these preparatory operations required for photographing a still picture. The SW2 starts an actual exposure operation.

That is, the mode microprocessor 41 can recognize that the SW2 will be depressed, i.e., shutter release will be performed, shortly, when it detects depression of the SW1. Accordingly, it can be determined that an instruction to stop moving-picture recording when the SW1 is depressed is most probably wrong. Hence, a misoperation can be prevented by cancelling the depression of the trigger button 34.

FIG. 5 is a flowchart illustrating such a state. A description will be provided of only a difference from the flowchart shown in FIG. 4. In FIG. 5, in step S108, it is determined if the SW1 of the shutter button 35 for still-picture recording is depressed. If the result of the determination in step S108 is affirmative, and if the video trigger is ON in step S109, the depression of the trigger button 34 is automatically cancelled irrespective of the time. The SW2 will be depressed while awaiting a shutter chance after depressing the SW1. Since the time of the shutter chance is not specified, the timer is not used. The same processing as in the first embodiment is performed after step S104.

As described above, by providing the SW1, only single timer processing of the mode microprocessor 41 is required, thereby simplifying the processing procedures.

According to the aboved-described embodiments, even if an operation to instruct the start and end of moving-picture recording operations is erroneously performed intending to record a still picture during moving-picture recording, the moving-picture recording is not immediately terminated. By performing an operation to instruct still-picture recording within a predetermined time period after the misoperation, the instruction to end the moving-picture recording is cancelled, and the moving-picture recording can be continued.

According to the above-described embodiments, even if an operation to end moving-picture recording is erroneously performed within a predetermined time period after instructing still-picture recording during the moving-picture recording, the wrong operation is cancelled, and the moving-picture recording is continued.

Accordingly, moving-picture recording is not interrupted by a misoperation which will be relatively frequently performed.

The individual components shown in outline or designated by blocks in the drawings are all well known in the camera arts and their specific construction and operation are not critical to the operation or the best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A composite camera integrating (i) a camera for recording moving pictures and (ii) a still-picture camera for recording still pictures, said camera comprising:

first instruction means for instructing start and stop of moving-picture recording operations;

second instruction means for instructing still-picture recording operations; and control means for (i) reserving execution of an instruction from said first instruction means when the instruction has been provided during a moving-picture recording operation, for (ii) cancelling the reserved instruction from said first instruction means when an instruction from said second instruction means has been provided within a predetermined time period after the instruction from said first instruction means, and for (iii) terminating the moving-picture recording operation by executing the reserved instruction from said first instruction means when no instruction has been provided from said second instruction means within the predetermined time period after the instruction from said first instruction means.

2. A composite camera integrating (i) a camera for recording moving pictures and (ii) a still-picture camera for recording still pictures, said camera comprising:

first instruction means for instructing start and stop of moving-picture recording operations;

second instruction means for instructing still-picture recording operations; and control means for cancelling an instruction from said first instruction means if the instruction is provided within a predetermined time period after an instruction from said second instruction means has been provided during a moving-picure recording operation.

3. A composite camera integrating (i) a camera for recording moving pictures and (ii) a still-picture camera for recording still pictures, said camera comprising:

first instruction means for instructing start and stop of moving-picture recording operations;

second instruction means having two steps for instructing still-picture recording operations; and control means for (i) reserving an execution of an instruction from said first instruction means when the instruction has been provided during a moving-picture recording operation, for (ii) cancelling the reserved instruction from said first instruction means when an operation in a first step of the second instruction means has been performed within a predetermined time period after the instruction from said first instruction means, and for (iii) terminating the moving-picture recording operation by executing the reserved instruction from said first instruction means when no operation in the first step of said second instruction means has been performed within the predetermined time period after the instruction from said first instruction means.

4. A composite camera integrating (i) a camera for recording moving pictures and (ii) a still-picture camera for recording still pictures, said camera comprising:

first instruction means for instructing start and stop of moving-picture recording operations;

second instruction means having two steps for instructing still-picture recording operations; and control means for cancelling an instruction from said first instruction means if the instruction is provided within a predetermined time period after an operation in the first step of said second instruction means has been performed during a moving-picure recording operation.

5. A camera comprising:

moving-picture recording means;

still-picture recording means;

first operation means for controlling said moving-picture recording means;

second operation means for controlling said still-picture recording means; and control means for cancelling an operation of said first operation means if said second operation means provides an instruction to begin an operation of said still-picture recording means within a predetermined time period after said first operation means has provided an instruction to stop said moving-picture recording means while said moving-picture recording means operates.

6. A camera according to claim 5, wherein said moving-picture recording means records moving images on a tape-shaped recording medium in the form of a video signal.

7. A camera according to claim 5, wherein said still-picture recording means records still pictures on a silver-halide film.

8. A camera according to claim 5, wherein said moving-picture recording means and said still-picture recording means share a portion of a photographing optical system.

9. A camera according to claim 8, wherein said moving-picture recording means further comprises an image pickup device, and a monitor means for monitoring a video signal output from said image pickup device.

10. A camera according to claim 5, wherein said control means stops an operation of said moving-picture recording means if no operation of said second operation means is performed even after the lapse of a predetermined time period after said first operation means has been operated while said moving-picture recording means operates.

11. A camera comprising:

a first camera unit;

a second camera unit;

first instruction means for instructing a photographing operation or a non-photographing operation of said first camera unit;

second instruction means for instructing a photographing operation or a non-photographing operation of said second camera unit; and control means for cancelling an instruction by said first instruction means if said second instruction means is operated within a predetermined time period after an instruction to stop an operation of said first camera unit has been provided by operating said first instruction means during a photographing operation of said first camera unit.

12. A camera according to claim 11, wherein said first camera unit comprises a video camera.

13. A camera according to claim 12, wherein said second camera unit comprises a silver-halide film.

14. A camera according to claim 12, wherein said first instruction means comprises a trigger switch for performing ON/OFF of moving-picture recording at every operation.

15. A camera according to claim 13, wherein said second instruction means comprises a release switch for performing a photographing operation at every operation.

16. A camera comprising:

a first camera unit;

a second camera unit;

first instruction means for controlling a photographing operation of said first camera unit;

second instruction means for controlling a photographing operation of said second camera unit; and control means for cancelling an operation of said first instruction means when said first instruction means and said second instruction means have been consecutively operated within a predetermined time period.

17. A camera according to claim 16, wherein said first camera unit comprises a video camera.

18. A camera according to claim 16, wherein said second camera unit comprises a silver-halide film.

19. A camera according to claim 16, wherein said first instruction means comprises a trigger switch for performing ON/OFF of moving-picture recording at every operation.

20. A camera according to claim 16, wherein said second instruction means comprises a release switch for performing a photographing operation at every operation.

* * * * *

UNITED STATES PATENT AND TRADEMARK OFFICE
CERTIFICATE OF CORRECTION

PATENT NO. : 5,634,162
DATED : May 27, 1997
INVENTOR(S) : ETSUROU SUZUKI

It is certified that error appears in the above-identified patent and that said Letters Patent is hereby corrected as shown below:

COLUMN 5

Line 60, "fop" should read --for.

COLUMN 9

Line 16, "be" should read --been--.

Signed and Sealed this

Second Day of December, 1997

Attest:

BRUCE LEHMAN

Attesting Officer

Commissioner of Patents and Trademarks